(12) United States Patent
Zheng

(10) Patent No.: US 10,988,159 B2
(45) Date of Patent: Apr. 27, 2021

(54) DRIVE MECHANISM AND AUTOMATIC SWING DEVICE INCLUDING THE SAME

(71) Applicant: Wonderland Switzerland AG, Steinhausen (CH)

(72) Inventor: Lei-Lei Zheng, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 219 days.

(21) Appl. No.: 15/992,734

(22) Filed: May 30, 2018

(65) Prior Publication Data
US 2018/0354542 A1    Dec. 13, 2018

(30) Foreign Application Priority Data

Jun. 7, 2017   (CN) .......................... 201710423138.6

(51) Int. Cl.
| | | |
|---|---|---|
| *A47D 9/04* | (2006.01) | |
| *B62B 9/22* | (2006.01) | |
| *A63G 9/16* | (2006.01) | |
| *A47D 13/10* | (2006.01) | |

(52) U.S. Cl.
CPC .................. B62B 9/22 (2013.01); A47D 9/04 (2013.01); *A47D 13/102* (2013.01); *A47D 13/105* (2013.01)

(58) Field of Classification Search
CPC .......... A63G 9/00; A63G 9/16; A47C 3/0255; A47C 21/00; A47C 21/006
USPC .................................................. 472/119-125
See application file for complete search history.

(56) References Cited

U.S. PATENT DOCUMENTS

| | | | | |
|---|---|---|---|---|
| 5,960,488 A | * | 10/1999 | Morris ................. | A61G 7/1005 4/496 |
| 2008/0194349 A1 | * | 8/2008 | Kwon .................. | A47D 13/105 472/118 |
| 2012/0052963 A1 | * | 3/2012 | Teng .................... | A47C 3/0255 472/119 |
| 2015/0309070 A1 | * | 10/2015 | Baskaran ................ | G01P 21/00 73/1.01 |

\* cited by examiner

*Primary Examiner* — Kien T Nguyen
(74) *Attorney, Agent, or Firm* — Burris Law, PLLC

(57) ABSTRACT

A drive mechanism which is adapted for use with a swing device includes two symmetrically-disposed electromagnetic driving units and a control unit. The electromagnetic driving units are adapted to be pivotally connected to a bottom of the swing device. The control unit is electrically connected to the electromagnetic driving units for controlling the electromagnetic driving units to be alternately activated and deactivated, so as to generate an intermittent magnetic force to drive swinging movement of the swing device. The swing device including the drive mechanism is also disclosed.

18 Claims, 16 Drawing Sheets

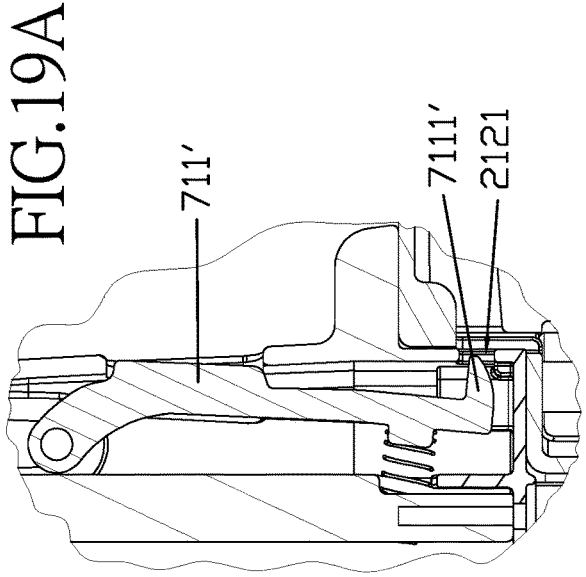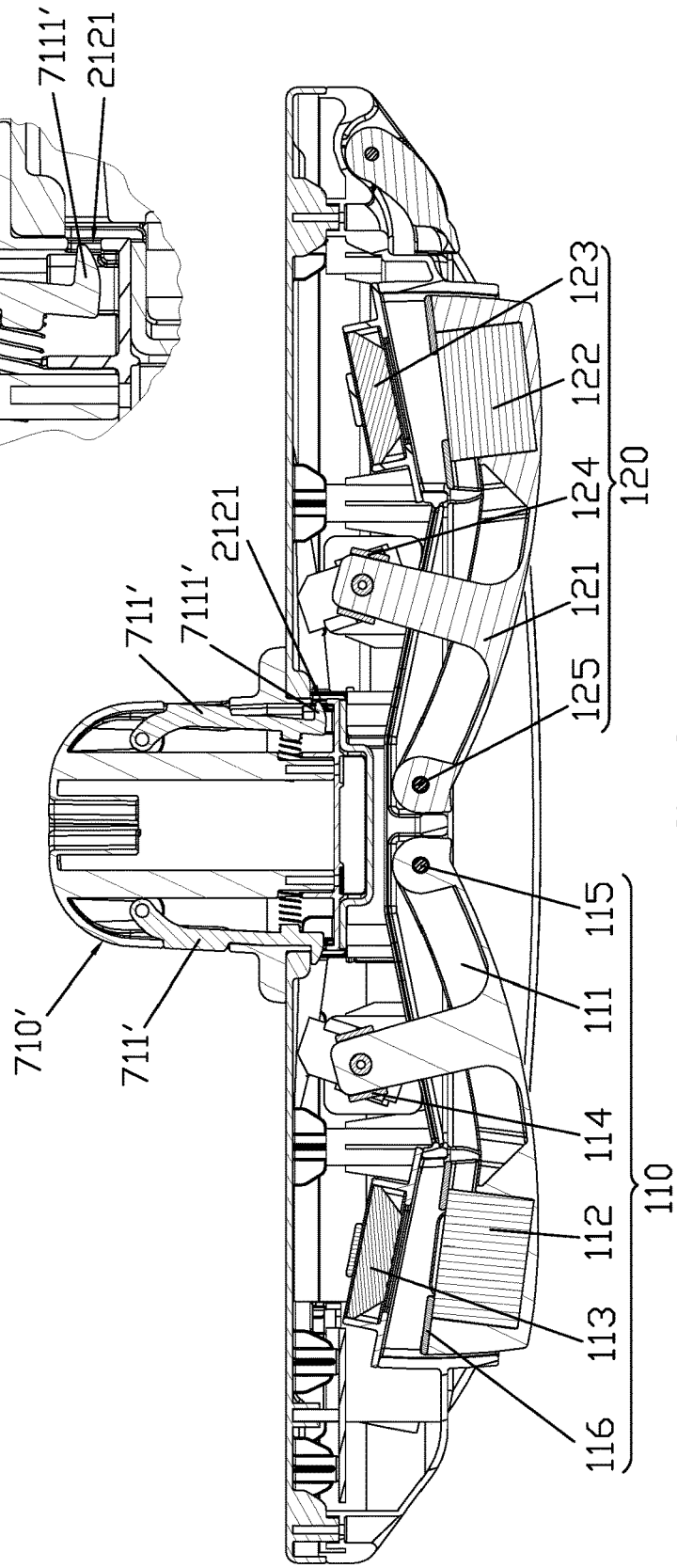

DRIVE MECHANISM AND AUTOMATIC SWING DEVICE INCLUDING THE SAME

CROSS-REFERENCE TO RELATED APPLICATION

This application claims priority of Chinese Patent Application No. 201710423138.6, filed on Jun. 7, 2017.

FIELD

The disclosure relates to a drive mechanism, and more particularly to a drive mechanism that can be incorporated in an automatic swing device, which is engageable with different baby carrying devices.

BACKGROUND

Baby carry devices are widely used in households with infants and toddlers. For example, baby rocking chair is a useful tool to soothe a crying baby or for a baby to comfortably lie thereon, and a baby can easily fall asleep by gentle rocking motion.

Conventional rocking chairs are designed such that rocking motion has to be performed manually by a care provider, which can increase interaction between the care provider and the baby, but may increase fatigue level of the care provider due to repetitive rocking action, and the care provider may not be able to perform other tasks at the same time. Commercially-available automatic rocking chair for baby provides hands-free rocking so that a care provider may have more time to perform other tasks or housework. However, conventional automatic rocking chair is typically configured with an irremovable baby lying seat, and cannot be cooperatively used with other baby carrying device (e.g., a child safety seat), which greatly limits the use of the conventional automatic rocking chair. In addition, conventional automatic rocking chair is typically configured to have only one rocking speed. Thus there is a need to solve the above-mentioned issues.

SUMMARY

Therefore, an object of the disclosure is to provide a drive mechanism and a swing device including the drive mechanism that can alleviate at least one of the drawbacks of the prior arts.

According to an aspect of the disclosure, the drive mechanism is adapted for use with a swing device. The drive mechanism includes two symmetrically-disposed electromagnetic driving units and a control unit. The electromagnetic driving units are adapted to be pivotally connected to a bottom of the swing device. The control unit is electrically connected to the electromagnetic driving units for controlling the electromagnetic driving units to be alternately activated and deactivated, so as to generate an intermittent magnetic force to drive swinging movement of the swing device.

According to another aspect of the disclosure, the swing device is adapted for mounting a baby carrying device thereon. The swing device includes a base seat and the above-mentioned drive mechanism.

The base seat has a top surface provided with an engaging mechanism which is adapted for retaining the baby carrying device. The drive mechanism has the control unit disposed in the base seat. The electromagnetic driving units are symmetrically disposed at a bottom surface of the base seat, and the drive mechanism drives swinging movement of the base seat to thereby swing the baby carrying device.

BRIEF DESCRIPTION OF THE DRAWINGS

Other features and advantages of the disclosure will become apparent in the following detailed description of the embodiment with reference to the accompanying drawings, of which:

FIG. 19 is a schematic partially sectional side view of FIG. 18;

FIG. 19A is an enlarged view of a part of FIG. 19, illustrating that a hook portion of a lock piece is engaged within a laterally-extending space portion of a second engaging groove;

DETAILED DESCRIPTION

Figure 1:
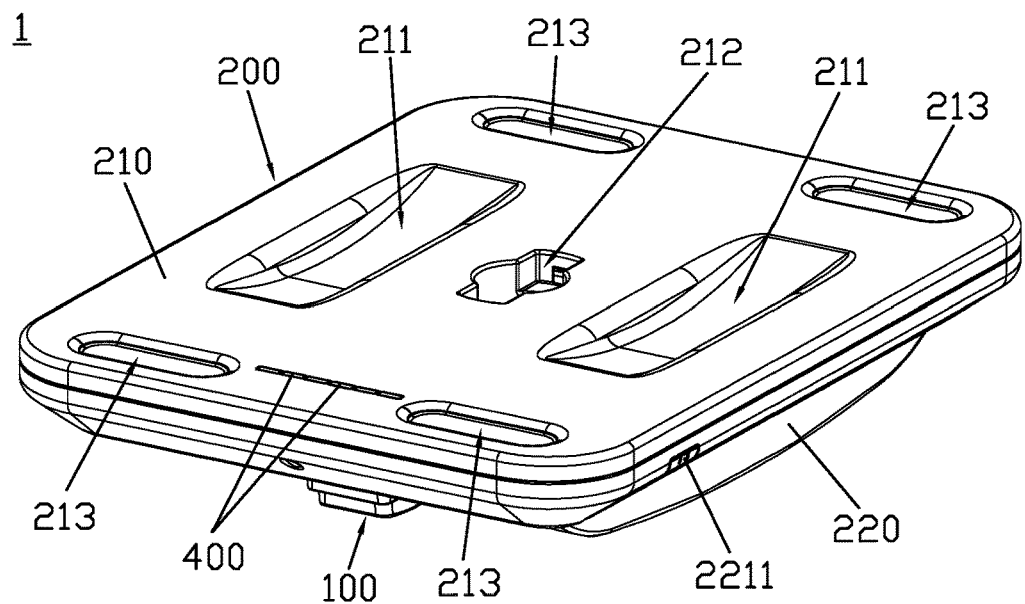
FIG. 1 is a top perspective view illustrating an embodiment of an automatic swing device according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
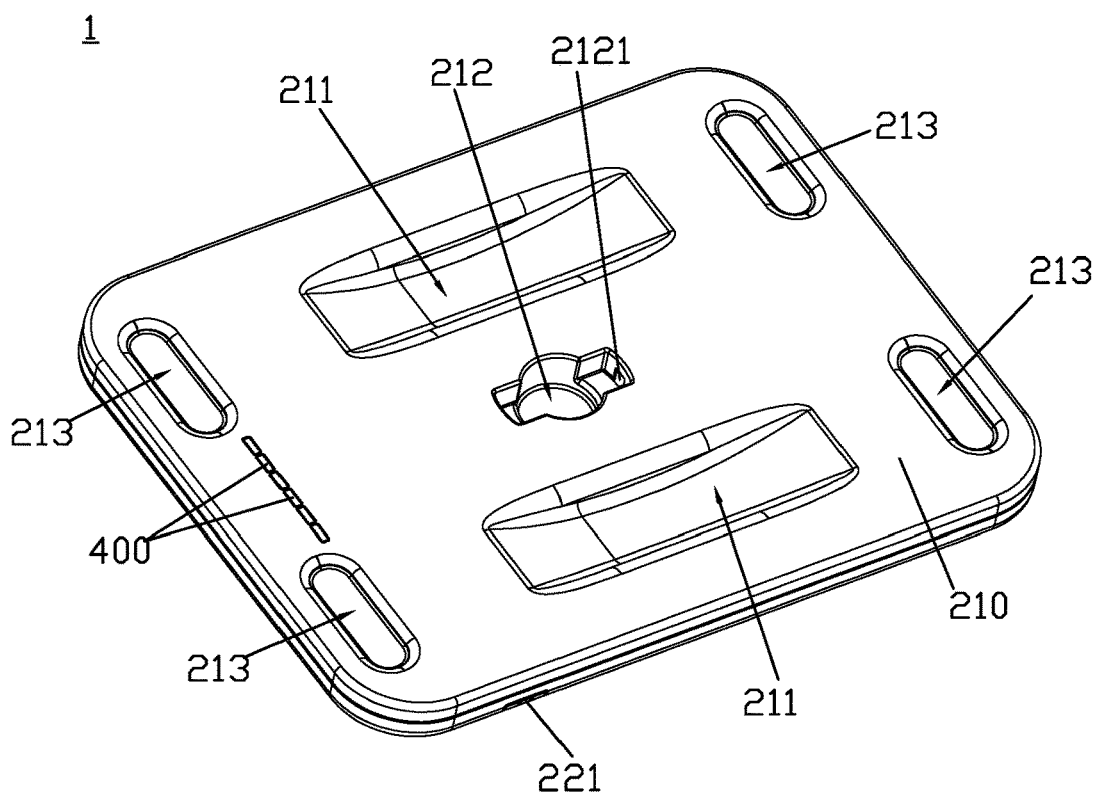
FIG. 2 is another top perspective view of the embodiment.
Figure 3:
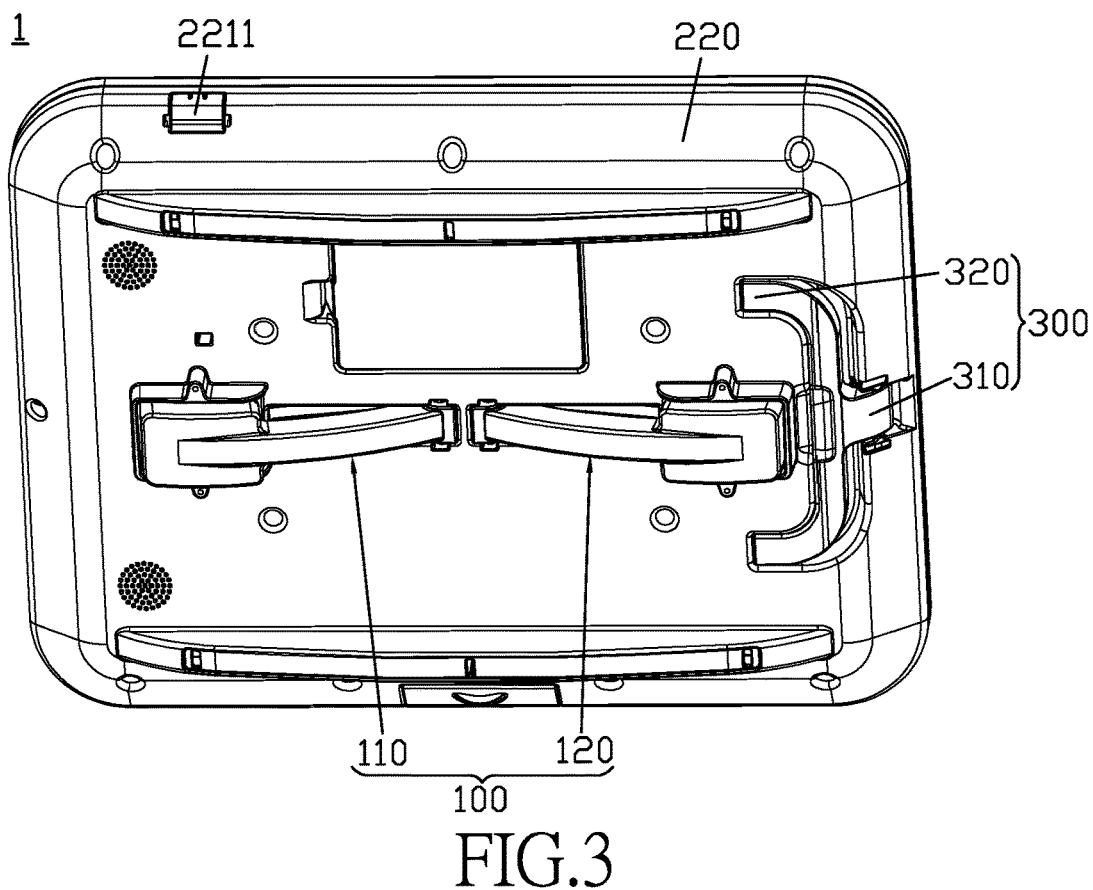
FIG. 3 is a bottom perspective view of the embodiment.

Referring to FIGS. 1 to 3, an embodiment of an automatic swing device includes a drive mechanism 100 and a base seat 200. The base seat 200 has complimentary top and bottom parts 210, 220 that are connected to each other. The top part 210 has a top surface provided with an engaging mechanism to be engageable with different baby carrying devices. The drive mechanism 100 is disposed on the bottom part 220 of the base seat 200, and is for driving swinging movement of the base seat 200 to thereby swing a baby carrying device mounted on the base seat 200.

Figure 4:
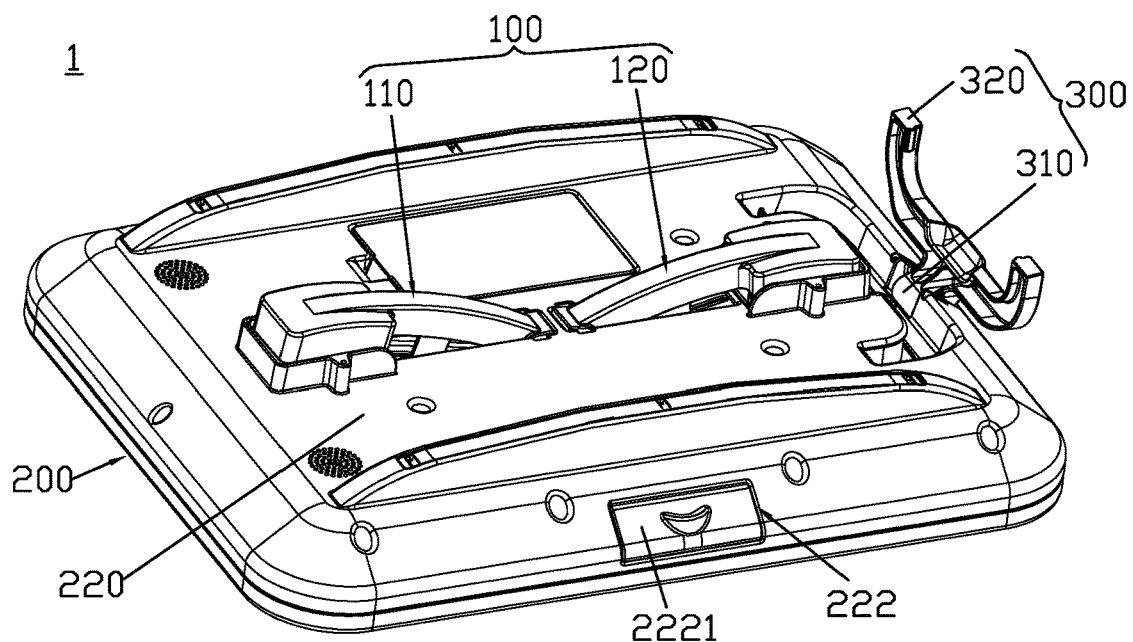
FIG. 4 is another bottom perspective view of the embodiment.
Figure 5:
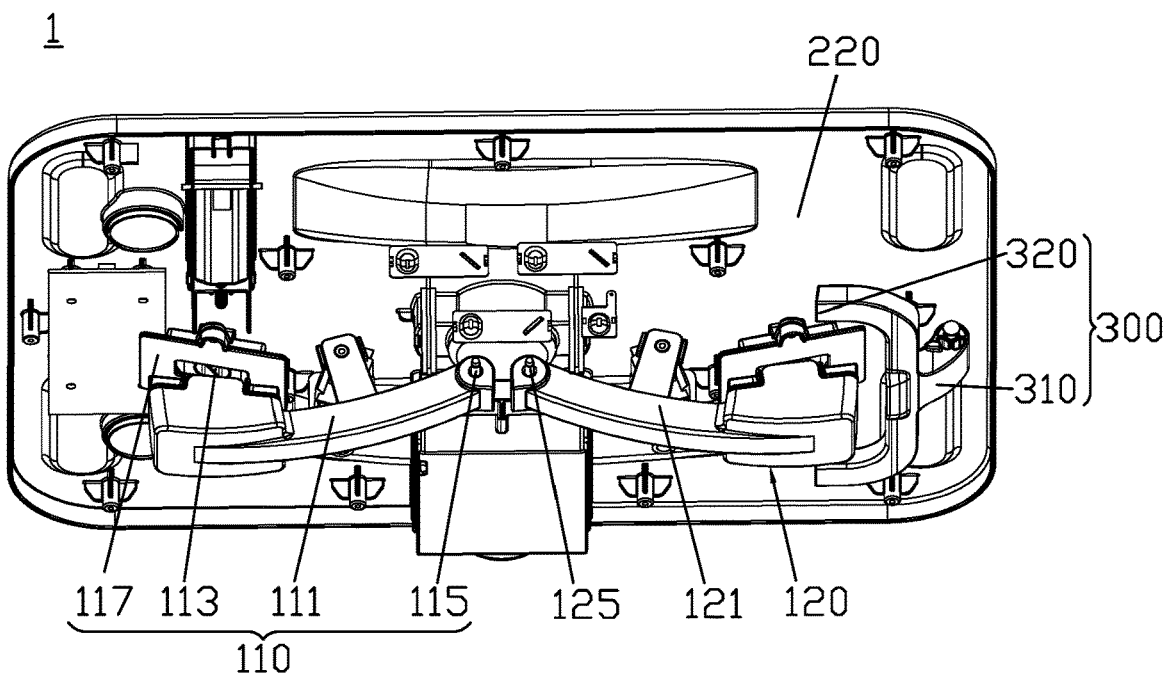
FIG. 5 is a schematic perspective view of the embodiment with a bottom part of a base seat of the automatic swing device being removed.

Referring to FIGS. 3 to 5, the drive mechanism 100 includes a control unit 100' (see FIG. 10), disposed in the base seat 200, and a first electromagnetic driving unit 110 and a second electromagnetic driving unit 120 that are symmetrically disposed at and pivotally connected to the bottom part 220 of the base seat 200. The control unit 100' is electrically connected to the first and second electromagnetic driving units 110, 120 for controlling the first and second electromagnetic driving units 110, 120 to be alternately activated and deactivated, so as to generate an intermittent magnetic force to drive swinging movement of the swing device.

In this embodiment, the first and second electromagnetic driving units 110, 120 are symmetrically disposed about a center portion of the bottom part 220 of the base seat 200. Since the first and second electromagnetic driving units 110, 120 are identical in structure, only the first electromagnetic driving unit 110 is described in detail in the following for the sake of brevity.

Referring to FIGS. 5, 6, 7, 7A, and 9, the first electromagnetic driving unit 110 includes a first support arm 111, a first electromagnet 112, a first permanent magnet 113, and a first sensor set 114. The first support arm 111 has a pivot end 1111 that is pivotally connected to the base seat 200 at a position proximate to a center of the bottom part 220 of the base seat 200 by a first pivot axle 115, and an opposite end 1112 that is opposite to the pivot end 1111 and that is exposed from the bottom part 220 of the base seat 200 for supporting the base seat 200. The opposite end 1112 of the first support arm 111 has an accommodating hole (see FIG. 6). The first electromagnet 112 is securely coupled to the opposite end 1112 of the first support arm 111, and is engaged in the accommodating hole. The first permanent magnet 113 is securely coupled to the bottom part 220 of the base seat 200, and corresponds in position to the first electromagnet 112 (see FIG. 9). The first sensor set 114 is disposed between the first support arm 111 and the bottom part 220 of the base seat 200, and is for detecting speed of the swing movement of the base seat 200 and angle of the base seat 200. The control unit 100' controls the first electromagnet 112 to be alternately activated and deactivated (i.e., by providing and stopping a current flow through the first electromagnet 112), so that the intermittent magnetic force is generated between the first electromagnet 112 and the first permanent magnet 113 to drive the swinging movement of the swing device about the first pivot axle 115. More specifically, when the control unit 100' controls the first electromagnet 112 to be activated, a magnetic repulsive force is generated between the first electromagnet 112 and the first permanent magnet 113.

Figure 6:
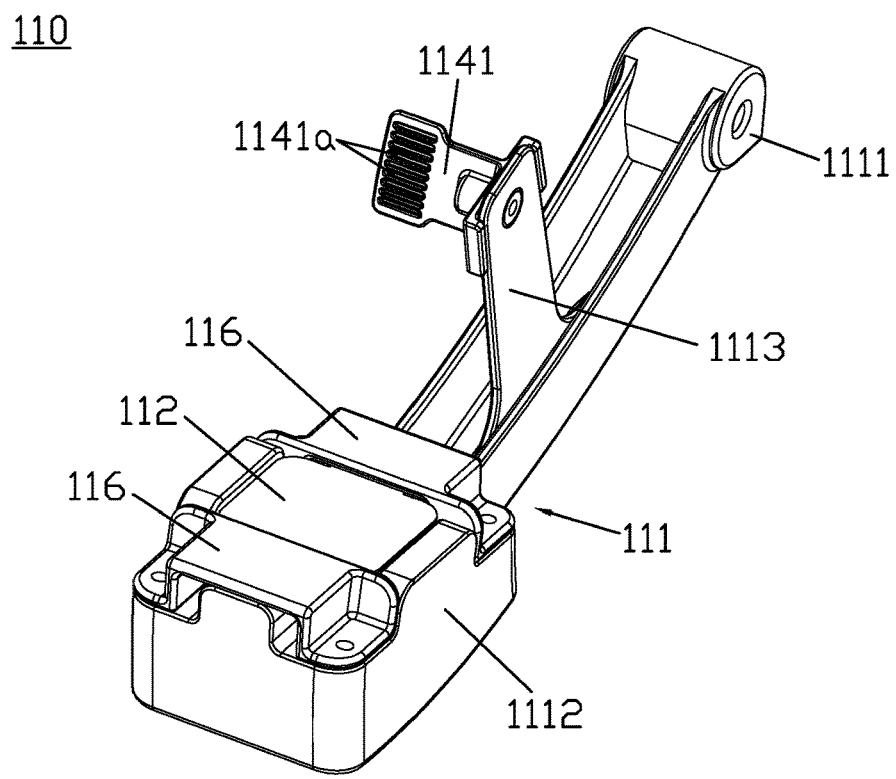
FIG. 6 is a perspective view of a first support arm and a first electromagnet of the embodiment.
Figure 7:
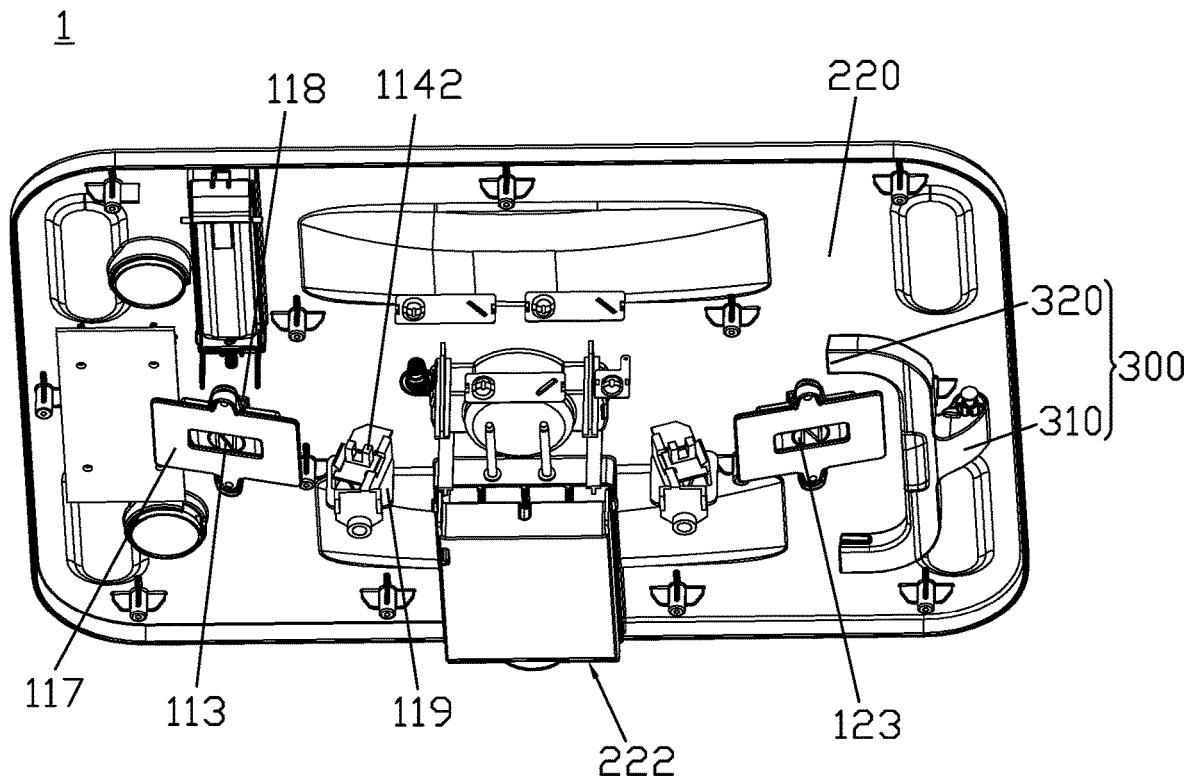
FIG. 7 is a schematic perspective view similar to FIG. 5, but with the first support arm and a second support arm being removed.
Figure 7A:
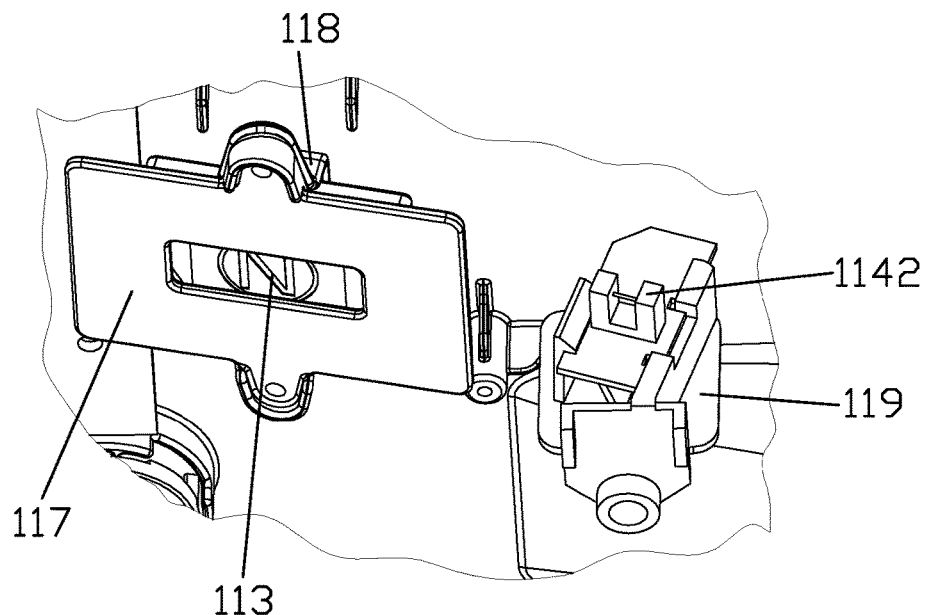
FIG. 7A is an enlarged view of a part of FIG. 7, illustrating how a first permanent magnet is mounted.
Figure 8:
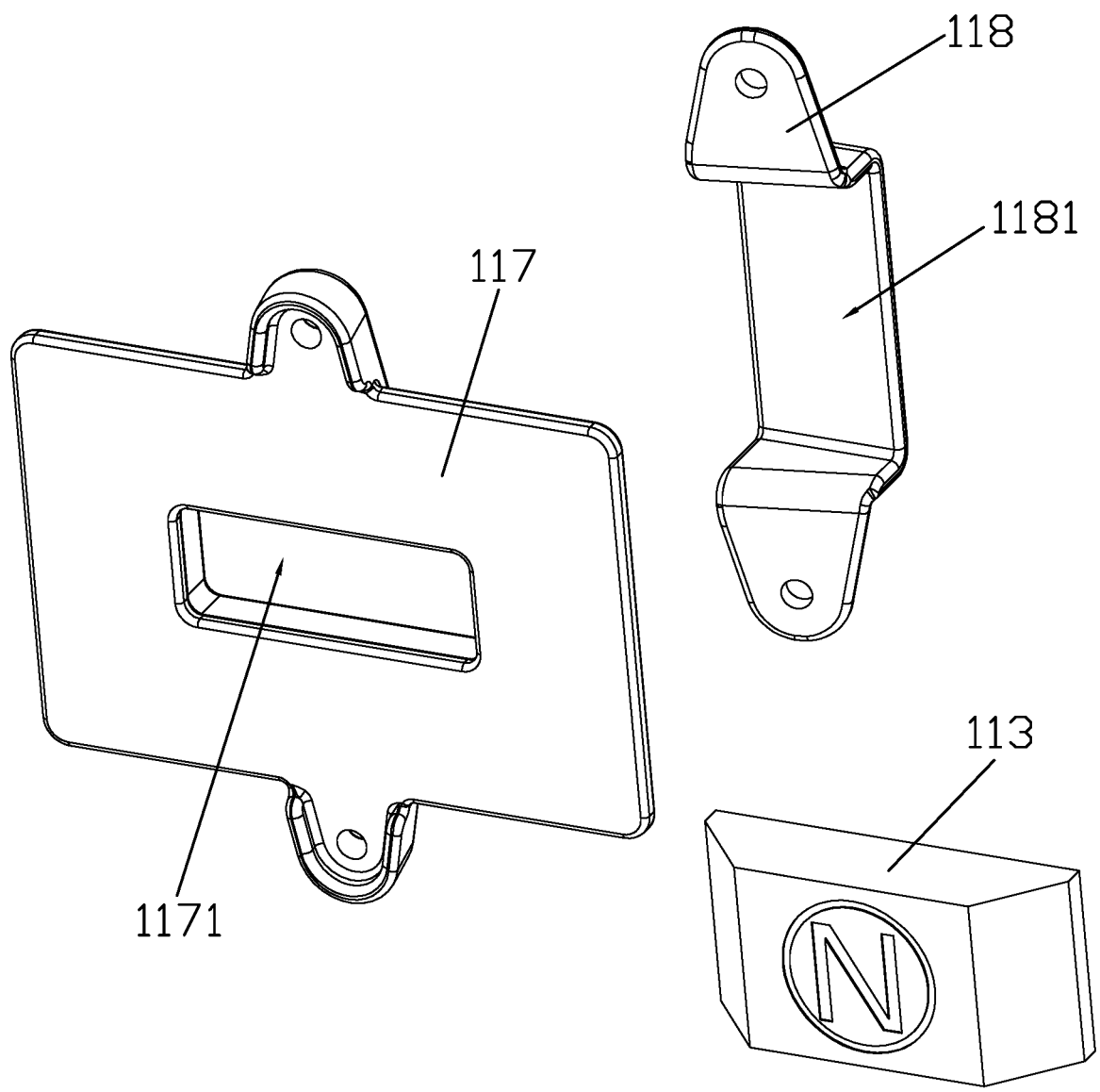
FIG. 8 is an exploded perspective view illustrating a first mounting seat, a first holding member, and the first permanent magnet of the embodiment.
Figure 9:
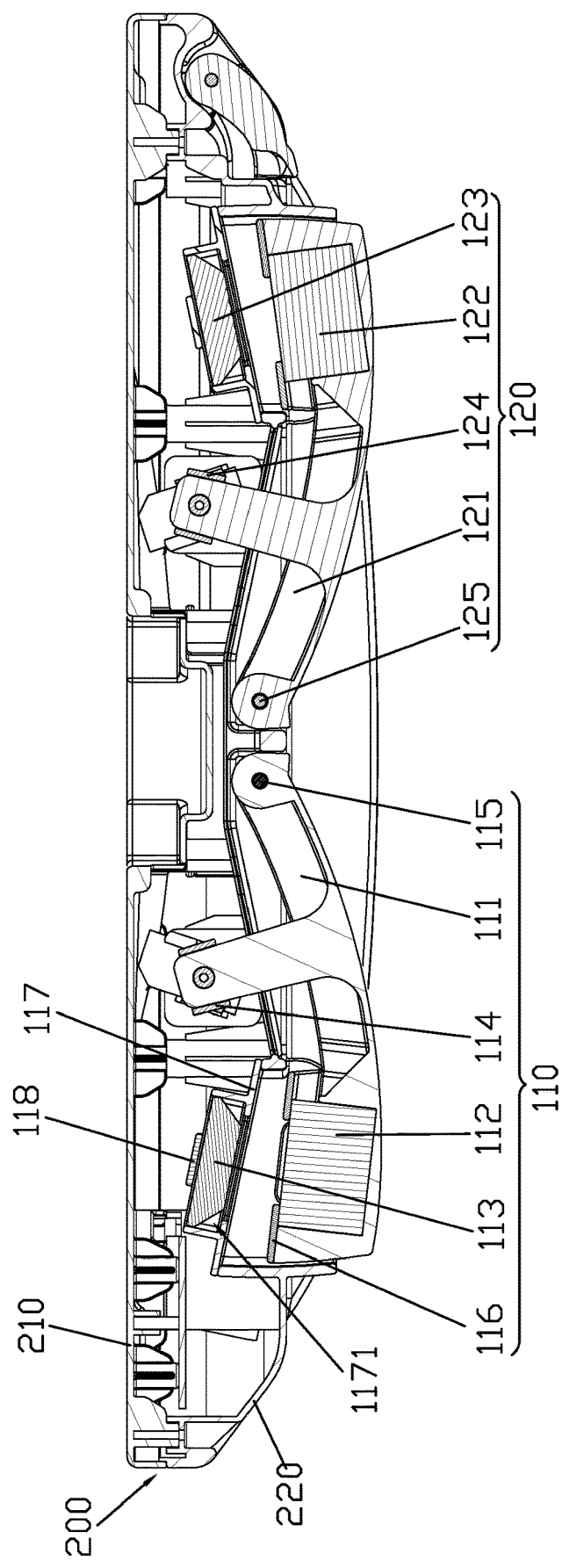
FIG. 9 is a partially sectional side view of the embodiment.

Referring to FIGS. 5, 6, and 9, the first electromagnetic driving unit 110 further includes two first retaining members 116 that securely retain the first electromagnet 112 at the opposite end 1112 of the first support arm 111. The first support arm 111 is provided with a first connecting strip 1113 on a side thereof. The first connecting strip 1113 extends into the base seat 200.

Referring to FIGS. 7, 7A, 8, and 9, the first electromagnetic driving unit 110 further includes a first mounting seat 117 and a first holding member 118. The first mounting seat 117 is for mounting of the first permanent magnet 113 thereon, and has a first opening 1171 for exposing the first permanent magnet 113. The first holding member 118 is formed with an accommodating groove 1181 for accommodating the first permanent magnet 113 therein. The first holding member 118 cooperates with the first mounting seat 117 to retain the first permanent magnet 113 therebetween. By virtue of the first mounting seat 117 and/or the first holding member 118 being fixedly connected to the bottom part 220 of the base seat 200 with the first opening 1171 opened toward the first electromagnet 112, the first permanent magnet 113 is disposed to correspond in position to the first electromagnet 112 (see FIG. 9).

Referring to FIGS. 6, 9, 10, and 10A, the first sensor set 114 includes a first displacement sensor 1141 and a first detecting sensor 1142. The first displacement sensor 1141 is mounted on the first connecting strip 1113, is disposed in the bottom part 220 of the base seat 200, and includes a plurality of displacement sensing spots (1141a). The first detecting sensor 1142 is electrically connected to the control unit 100', and is fixedly disposed in the bottom part 220 of the base seat 200 at a position corresponding to the displacement sensing spots (1141a) for monitoring the displacement sensing spots (1141a) and sending monitoring information to the control unit 100'.

In this embodiment, the first displacement sensor 1141 is an optical grating, and the first detecting sensor 1142 monitors the displacement sensing spots (1141a) by using diffraction grating principle. In other embodiments, other techniques may be employed for monitoring the displacement sensing spots (1141a) for displacement measurement.

Figure 10:
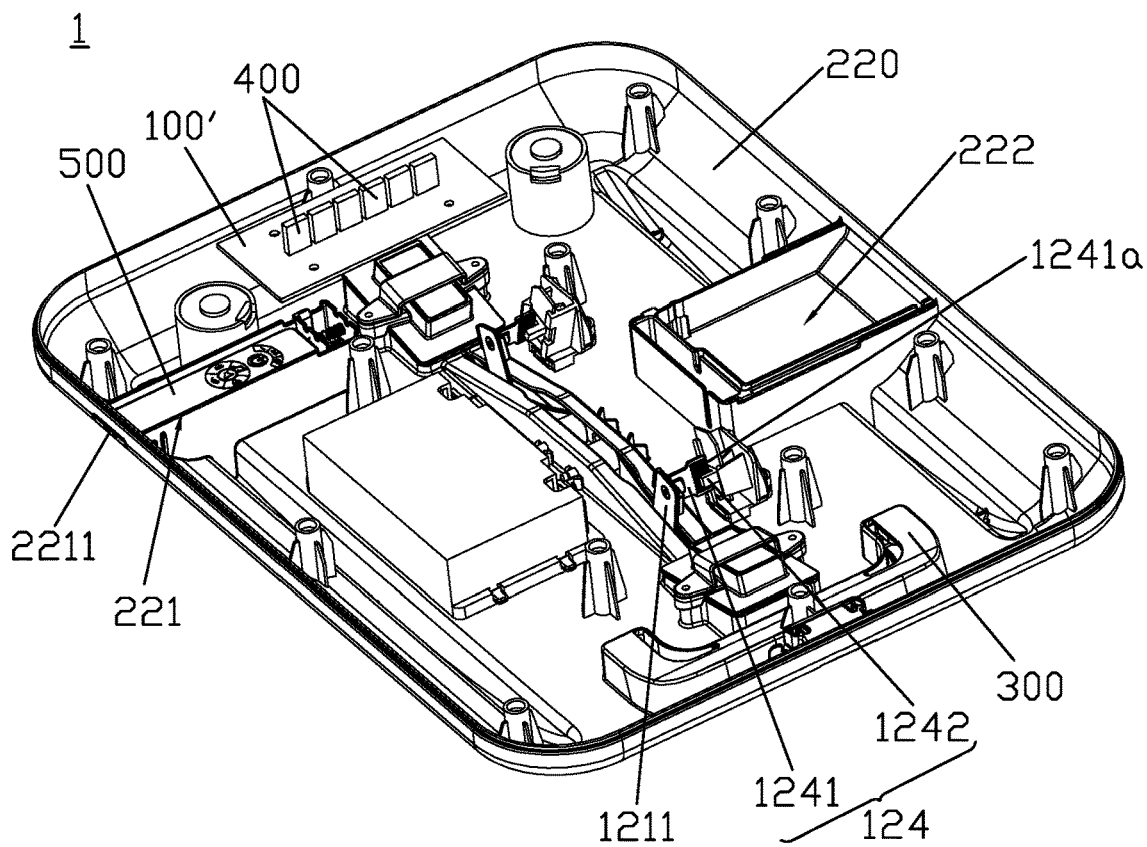
FIG. 10 is a schematic perspective view of the embodiment with a top part of the base seat being removed.
Figure 10A:
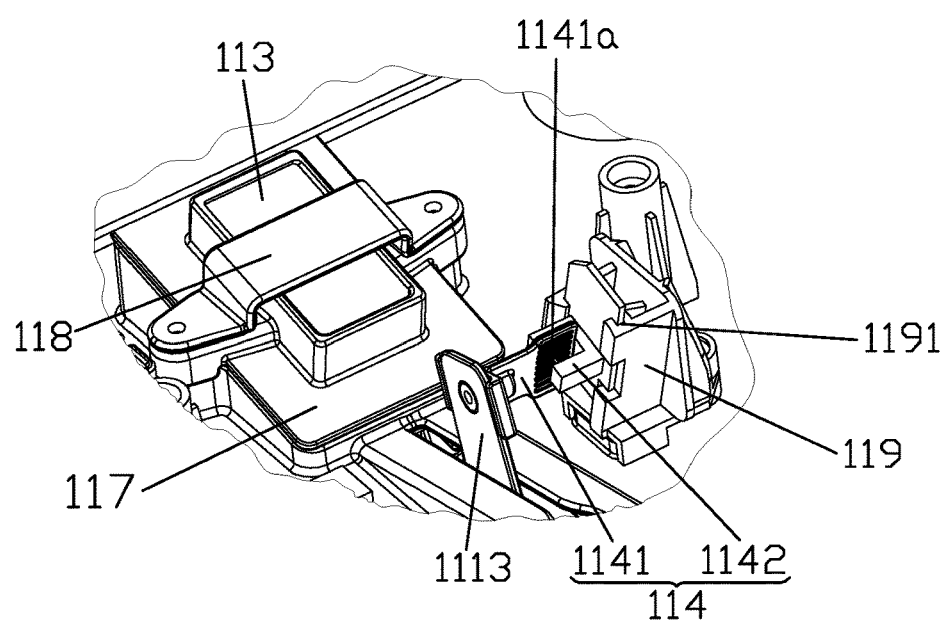
FIG. 10A is an enlarged view of a part of FIG. 10, illustrating how the first permanent magnet and a first sensor set are mounted.

Referring to FIGS. 10 and 10A, the first electromagnetic driving unit 110 further includes a sensor-connecting member 119 that is fixedly disposed on the bottom part 220 of the base seat 200 and that has a sensor coupling portion 1191. The first detecting sensor 1142 is coupled to the sensor coupling portion 1191 of the sensor-connecting member 119 and protrudes from the sensor-connecting member 119, such that the first detecting sensor 1142 corresponds in position to the displacement sensing spots (1141a).

Referring back to FIG. 9, the second electromagnetic driving unit 120 includes a second support arm 121, a second electromagnet 122, a second permanent magnet 123, and a second sensor set 124. The second support arm 121 has a pivot end pivotally connected to the bottom part 220 of the base seat 200 at a position proximate to a center of the bottom part 220 of the base seat 200 by a second pivot axle 125, and an opposite end opposite to the pivot end 1111. The first and second support arms 111, 121 are aligned, and the first and second pivot axles 115, 125 extend substantially in the same direction. The second electromagnet 122 is securely coupled to the opposite end of the second support arm 121. The second permanent magnet 123 is securely coupled to the bottom part 220 of the base seat 200, and corresponds in position to the second electromagnet 122.

The second sensor set 124 is disposed between the second support arm 121 and the bottom part 220 of the base seat 200, and is for detecting speed of the swing movement of the swing device and angle of the base seat 200. The control unit 100' controls the second electromagnet 122 to be alternately activated and deactivated (i.e., by providing and stopping a current flow through the second electromagnet 122), so that an intermittent magnetic force is generated between the second electromagnet 122 and the second permanent magnet 123 to drive the swinging movement of the swing device about the second pivot axle 125. More specifically, when the control unit 100' controls the second electromagnet 122 to be activated, a magnetic repulsive force is generated between the second electromagnet 122 and the second permanent magnet 123.

Referring to FIGS. 10 and 10A, the second sensor set 124 includes a second displacement sensor 1241 and a second detecting sensor 1242. The second displacement sensor 1241 is mounted on a second connecting strip 1211 which is provided on a side of the second support arm 121, is disposed in the bottom part 220 of the base seat 200, and includes a plurality of displacement sensing spots (1241a). The second detecting sensor 1242 is electrically connected to the control unit 100', and is fixedly disposed in the bottom part 220 of the base seat 200 at a position corresponding to the displacement sensing spots (1241a) of the second displacement sensor 1241 for monitoring the displacement sensing spots (1241a) and sending monitoring information to the control unit 100'.

In this embodiment, the structures of the remaining components of the second electromagnetic driving unit 120 are identical to those of the first electromagnetic driving unit 110, thus further details are not provided herein for the sake of brevity.

Figure 11:
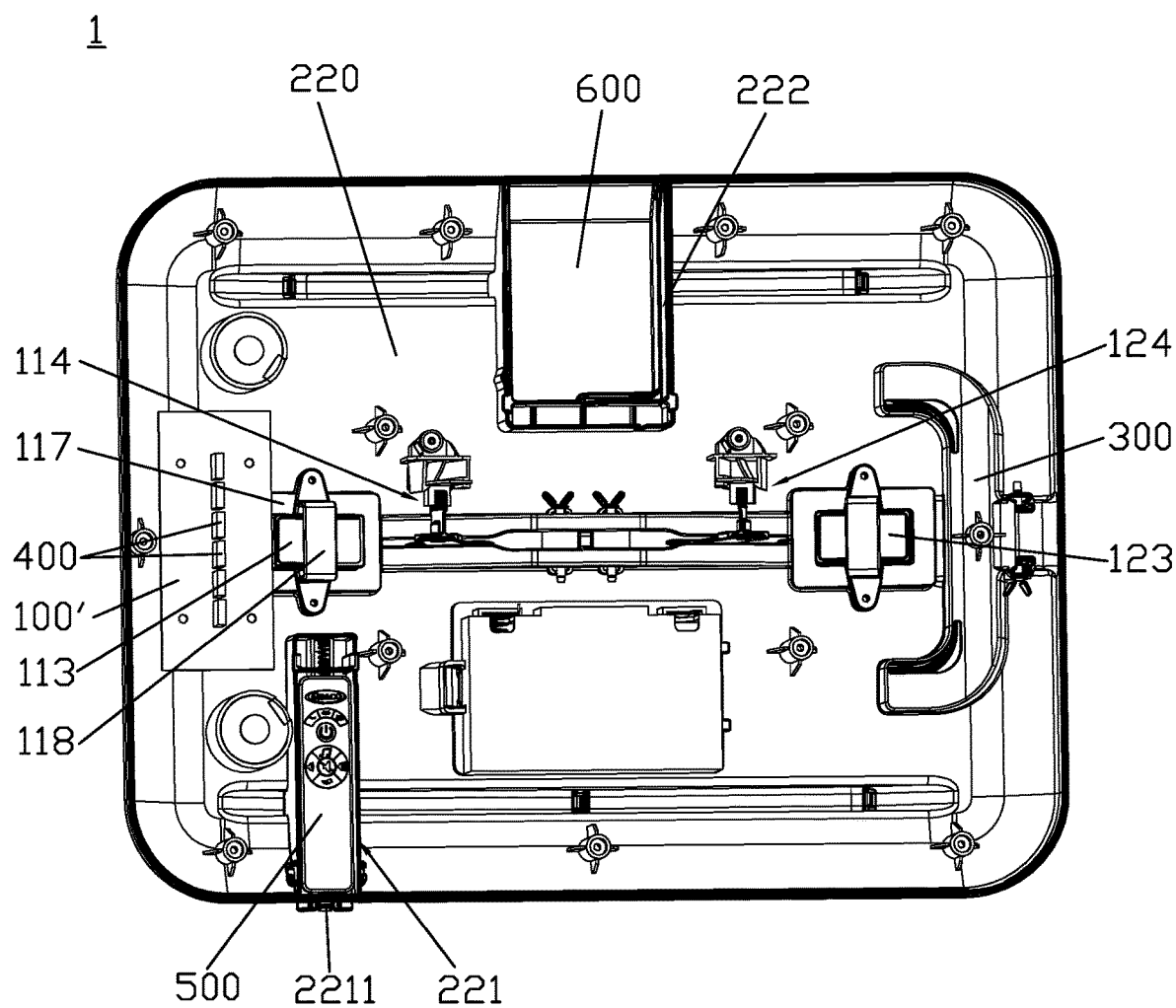
FIG. 11 is a top view of FIG. 10.
Figure 12:
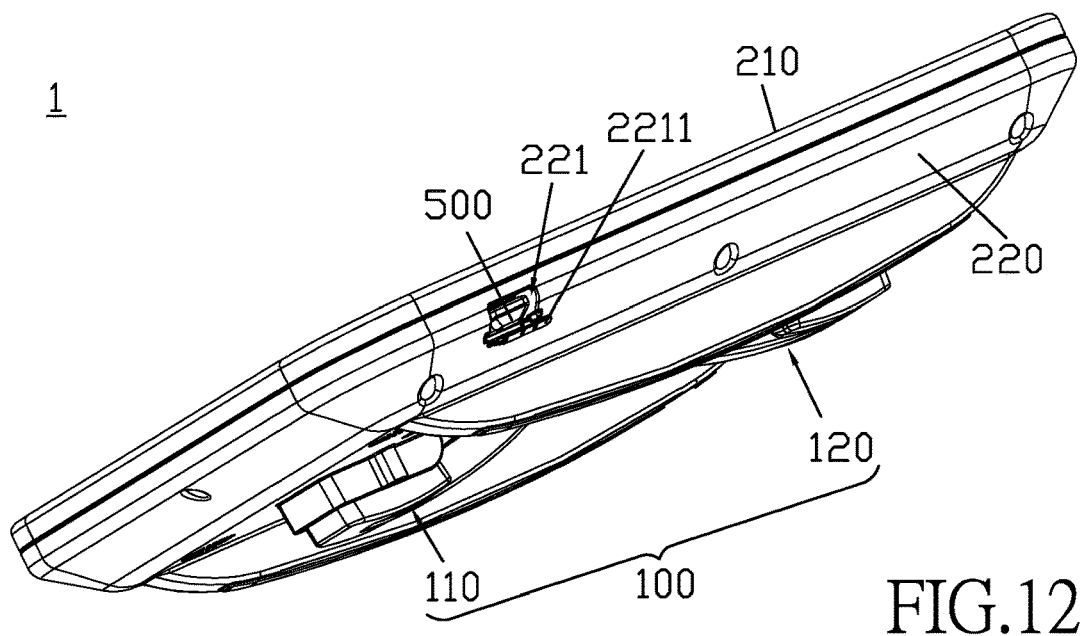
FIG. 12 is a schematic perspective view of the embodiment from another angle.
Figure 12A:
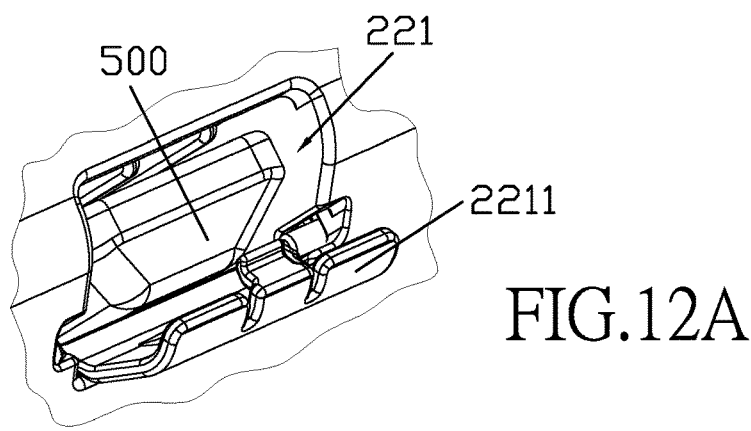
FIG. 12A is an enlarged view of a part of FIG. 12, illustrating that a remote controller is disposed within a first container.
Figure 13:
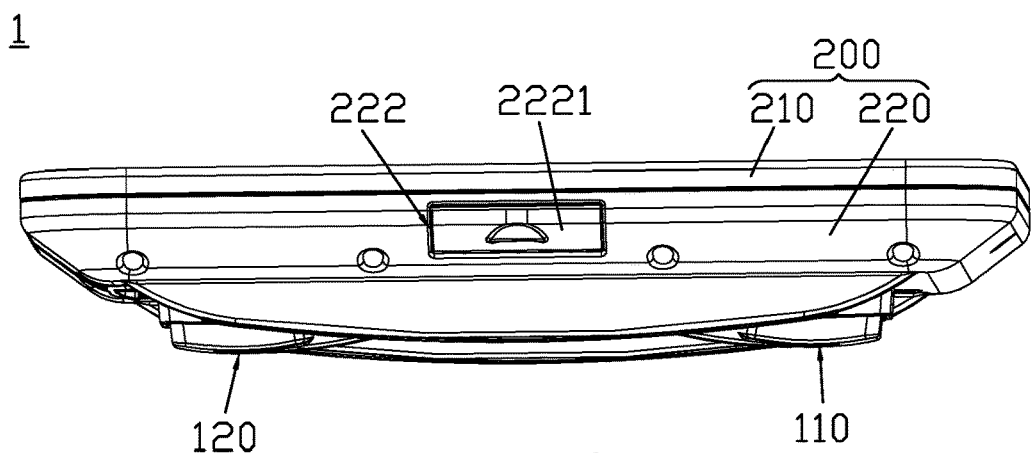
FIG. 13 is a side view of the embodiment.
Figure 16:
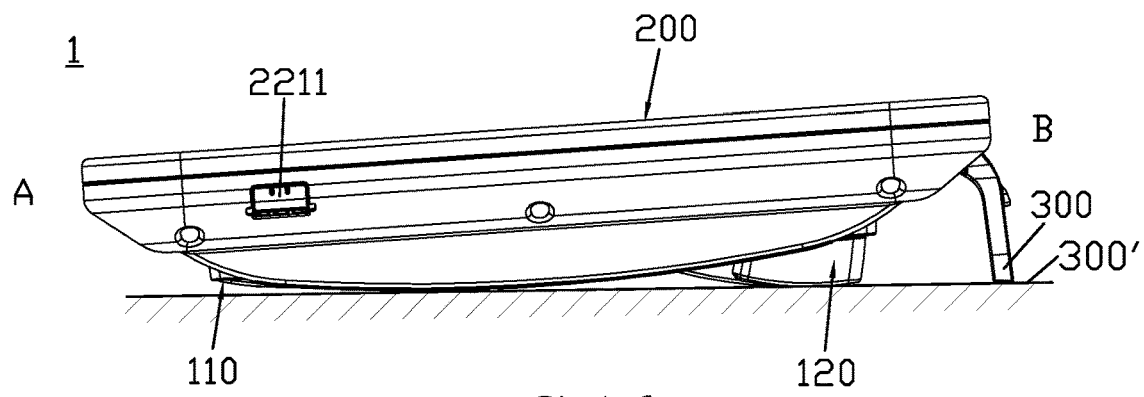
FIG. 16 is another schematic side view illustrating that the swinging movement of the automatic swing device is arrested by using a movement-arresting member.

Referring to FIGS. 3, 4, and 11, the automatic swing device further includes a movement-arresting member 300 pivotally connected to a bottom surface of the base seat 200. The movement-arresting member 300 has a pivot portion 310 and a contact portion 320 respectively formed on opposite ends thereof. The pivot portion 310 of the movement-arresting member 300 is pivoted to an end portion of bottom part 220 of the base seat 200, and has a pivot axle (not shown) aligned with the first and second pivot axles 115, 125. The movement-arresting member 300 is pivotable between an extended position, where the contact portion 320 of the movement-arresting member 300 is in contact with a contact surface 300' (see FIG. 16) on which the base seat 200 is disposed, so as to arrest the swinging movement of the base seat 200, and a collapsed position, where the contact portion 320 of the movement-arresting member 300 is folded to be proximate to the base seat 200 and not in contact with the contact surface 300' so as to permit the swinging movement of the base seat 200.

Referring to FIGS. 2 and 11, the automatic swing device further includes a plurality of indicating lights 400 disposed in the base seat 200 and electrically connected to the control unit 100'. The indicating lights 400 are exposed from the top part 210 of the base seat 200 for displaying and indicating the swing speed of the automatic swing device.

Referring to FIGS. 10, 10A, 11, 12, 12A, and 13, the automatic swing device further includes a first container 221 for storing a remote controller 500 which is operable to control the swing speed of the swing device, a second container 222 for storing a portable charger 600, a first cover 2211 disposed at a side of the bottom part 220 of the base seat 200 for removably covering the first container 221, and a second cover 2221 disposed at an opposite side of the bottom part 220 of the base seat 200 for removably covering the second container 222. A power connector is disposed in the second container 222, and can be connected to the portable charger 600 or an external power supply for supplying electric power to the automatic swing device. When the portable charger 600 is used as the power supply, it can be placed completely in the second container 222 so as to provide a neat appearance to the automatic swing device.

Referring to FIGS. 9, and 14 to 16, the operation of the automatic swing device is described in detail in the following.

After the automatic swing device is provided with electric power, the control unit 100' controls current flow through the first and second electromagnets 112, 122 so as to generate the magnetic repulsive force between the first electromagnet 112 and the first permanent magnet 113 or between the second electromagnet 122 and the second permanent magnet 123, so that the first electromagnet 112 is prevented from being magnetically attracted to the first permanent magnet 113, and the second electromagnet 122 is prevented from being magnetically attracted to the second permanent magnet 123.

Figure 14:
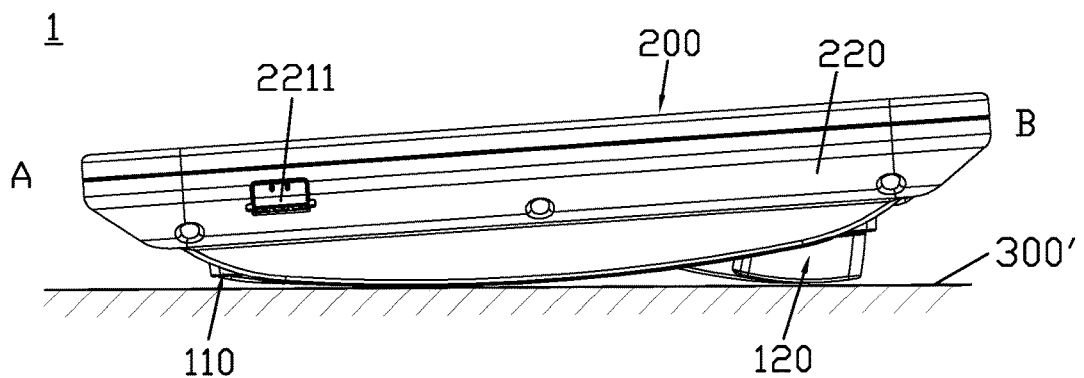
FIGS. 14 and 15 are schematic side views illustrating swinging movement of the embodiment.
Figure 15:
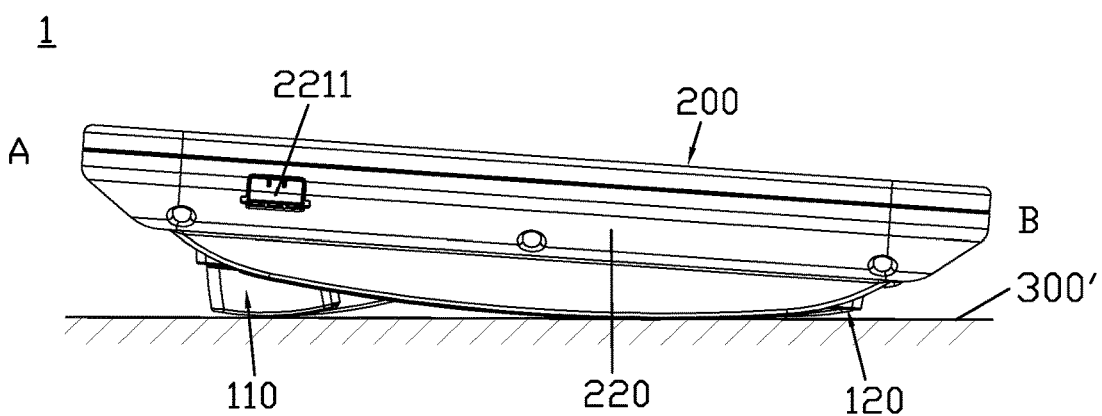

The first and second detecting sensors 1142, 1242 respectively monitor the first and second displacement sensing spots (1141a, 1241a) and send monitoring information to the control unit 100', so as for the control unit 100' to determine whether the base seat 200 is swung toward side A or side B based on the monitoring information. For example, when the base seat 200 is swung toward side A, as shown in FIG. 14, the control unit 100' controls current flow through the first electromagnet 112 so as to generate the magnetic repulsive force between the first electromagnet 112 and the first permanent magnet 113 to thereby swing the base seat 200 toward side B, as shown in FIG. 15. During the swinging movement from side A to side B, the control unit 100' calculates the distance between the second electromagnet 122 and the second permanent magnet 123 based on the monitoring information from the second detecting sensor 1242. When the distance between the second electromagnet 122 and the second permanent magnet 123 is equal to a pre-determined value, the control unit 100' stops the current flow through the first electromagnet 112 and provides current flow through the second electromagnet 122 to generate the magnetic repulsive force between the second electromagnet 122 and the second permanent magnet 123 to thereby swing the base seat 200 back toward side A. In this way, the angle of the base seat 200 during the swinging movement is prevented from being affected by a magnetic attractive force between the second electromagnet 122 and the second permanent magnet 123.

During the swinging movement from side B back to side A, the control unit 100' calculates the distance between the first electromagnet 112 and the first permanent magnet 113 based on the monitoring information from the first detecting sensor 1142. When the distance between the first electromagnet 112 and the first permanent magnet 113 is equal to the pre-determined value, the control unit 100' stops the current flow through the second electromagnet 122 and provides current flow through the first electromagnet 112 to generate the magnetic repulsive force between the first electromagnet 112 and the first permanent magnet 113 to thereby swing the base seat 200 toward side B again. In this way, the base seat 200 is swung back and forth between side A and side B in an automatic manner with the swing speed and angle of the base seat 200 controlled by how frequent the switching of the current flow through the first and second electromagnets 112, 122 occurs.

Referring back to FIGS. 1 and 2, the engaging mechanism disposed on the top part 210 of the base seat 200 can engage different baby carrying devices, such as a child safety seat, a baby rocking chair, a bassinet, etc., but not limited thereto.

In this embodiment, the top surface of the top part 210 of the base seat 200 is formed with two first engaging grooves 211 that are elongated and that are spaced apart from each other, a second engaging groove 212 that is located between the first engaging grooves 211, and a plurality of third engaging grooves 213 that are respectively formed in corners of the top surface of the top part 210 of the base seat 200. The first, second, and third engaging grooves 211, 212, 213 can be used alone or together to engage different baby carrying devices. In other words, a baby carrying device is engageable in at least one of the first, second, and third engaging grooves 211, 212, 213.

Figure 17:
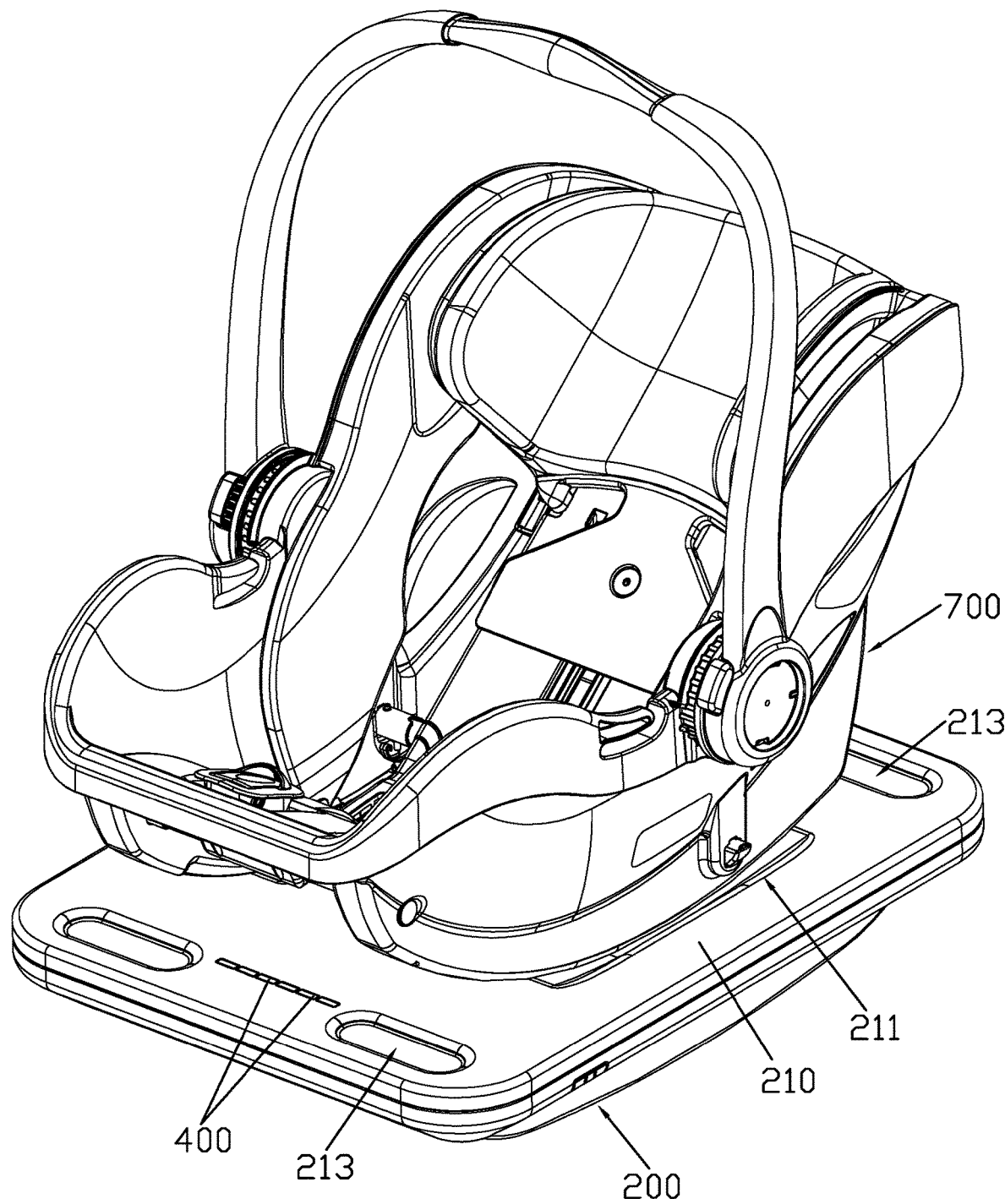
FIG. 17 is a perspective view illustrating that the embodiment is used together with a child safety seat.

FIG. 17 illustrates that the automatic swing device is used with a child safety seat 700. The child safety seat 700 is placed directly on the automatic swing device with a bottom portion of the child safety seat 700 engaged in the first engaging grooves 211. After such engagement, the child safety seat 700 can swing together with the base seat 200 through the operation of the drive mechanism 100.

Figure 18:
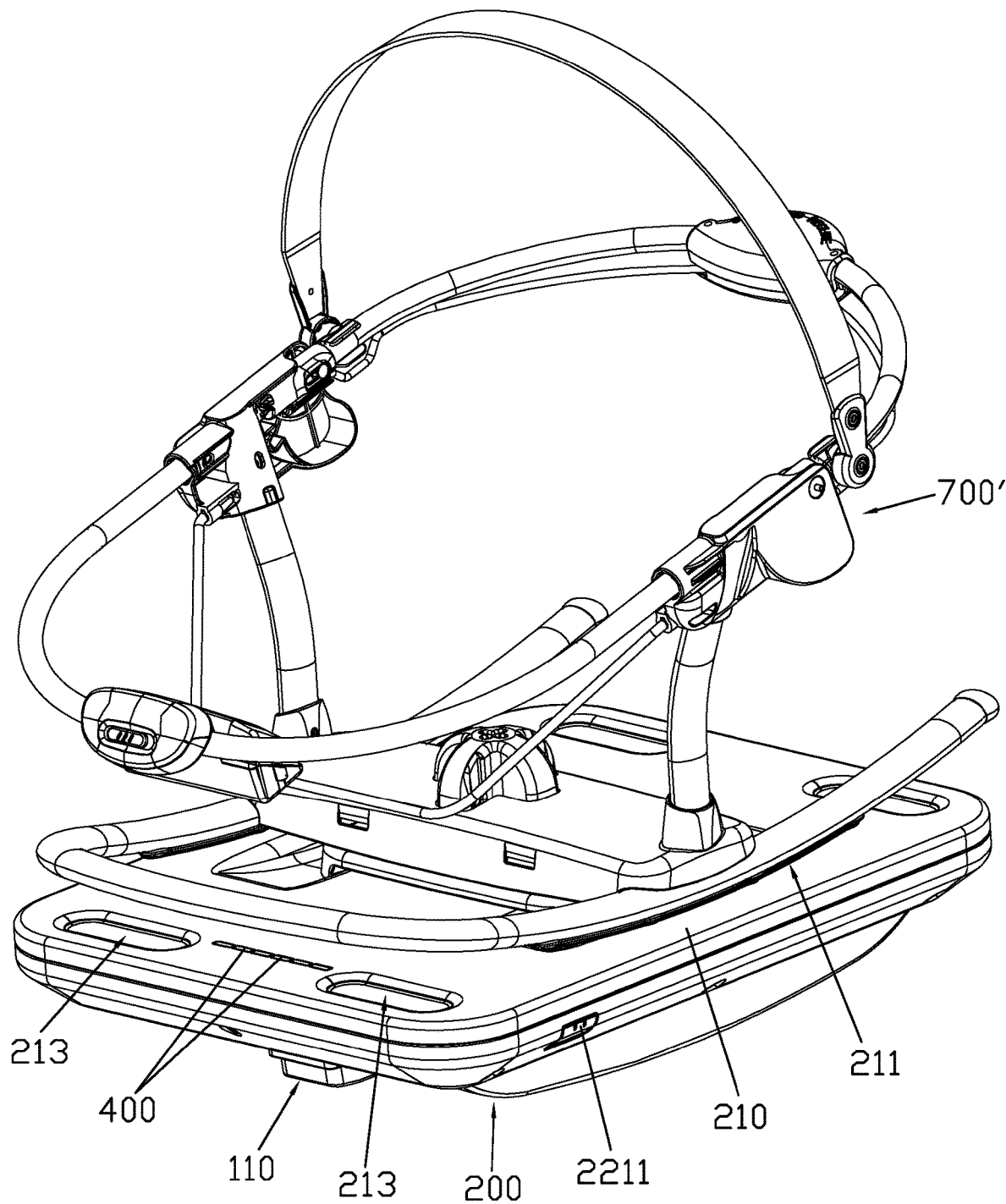
FIG. 18 is a perspective view illustrating that the embodiment is used together with a baby rocking chair.
Figure 20:
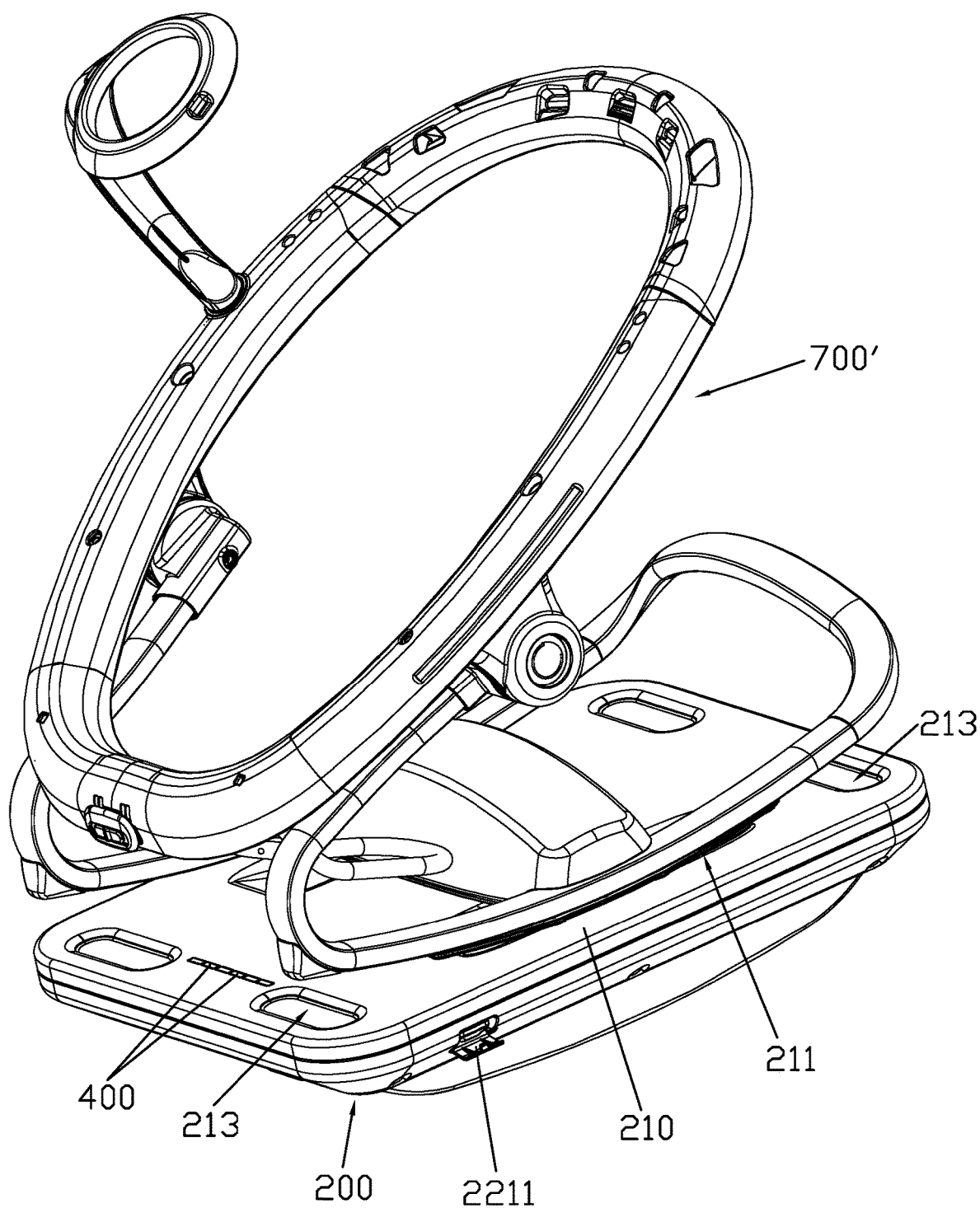
FIG. 20 is a perspective view illustrating that the embodiment is used together with another baby rocking chair.

FIGS. 18, 19, and 19A illustrate that the automatic swing device is used with a rocking chair 700'. The rocking chair 700' can be placed directly on the automatic swing device with a bottom portion of the rocking chair 700' engaged in the first engaging grooves 211. Alternatively, the rocking chair 700' may be provided with a coupling member 710' that is detachably disposed on a bottom of the rocking chair 700', and a lock piece 711' that is pivotally connected to the coupling member 710' and that is formed with a hook portion 7111' at an end thereof. The hook portion 7111' of the lock piece 711' protrudes out of the coupling member 710'. The second engaging groove 212 has a laterally-extending space portion 2121 that is adapted to removably retain the hook portion 7111' of the lock piece 711' therein. The rocking chair 700' is securely mounted on the base seat 200 by engaging the bottom portion of the rocking chair 700' in the first engaging grooves 211 and by engaging the coupling member 710' in the second engaging groove 212 with the hook portion 7111' of the lock piece 711' inserted into the laterally-extending space portion 2121 of the second engaging groove 212 (see FIGS. 19 and 19A). In this way, the rocking chair 700' can swing together with the base seat 200 through the operation of the drive mechanism 100. FIG. 20 illustrates that the automatic swing device is used with another type of baby rocking chair 700'.

Figure 21:
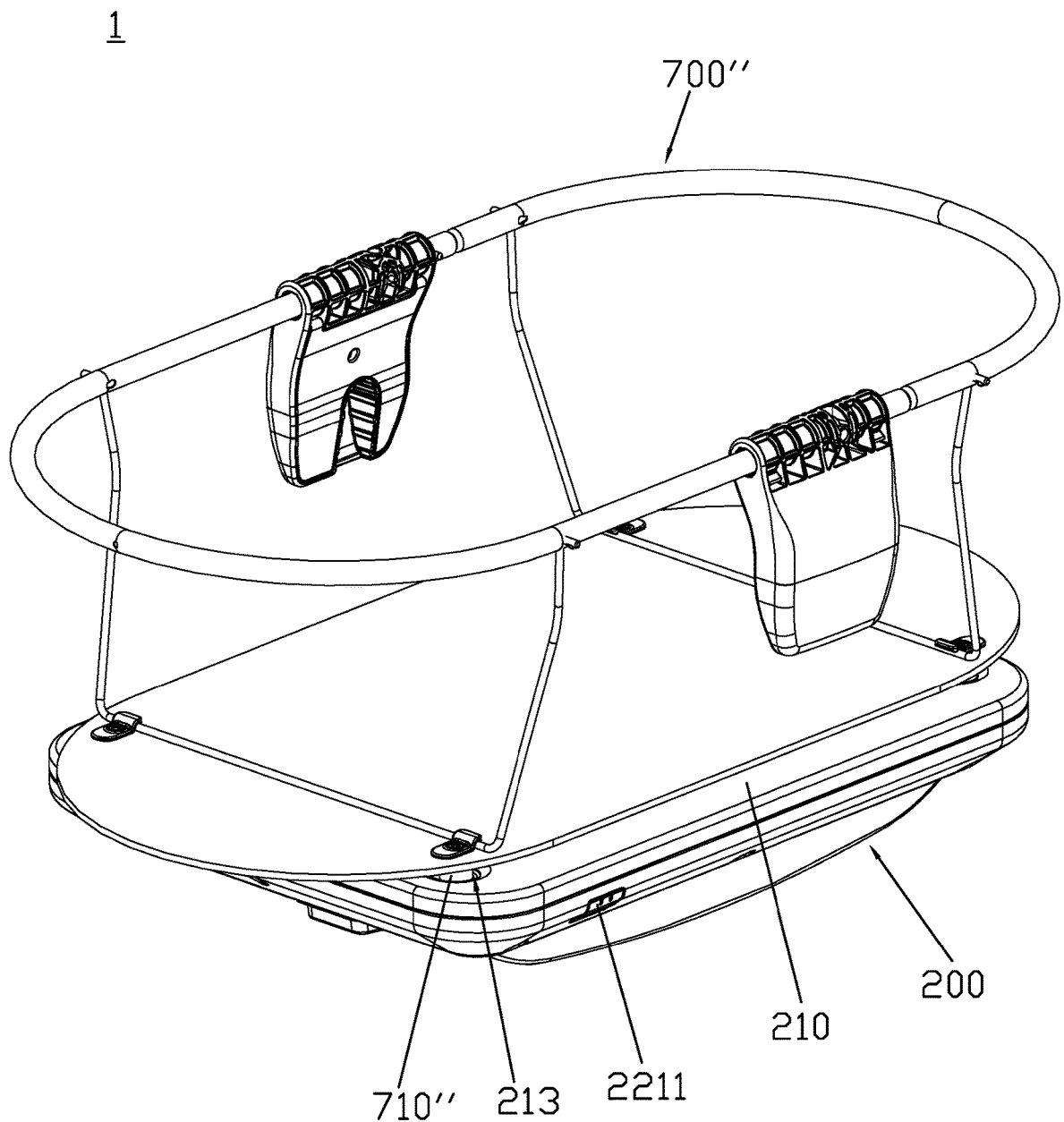
FIG. 21 is a perspective view illustrating that the embodiment is used together with a bassinet.
Figure 22:
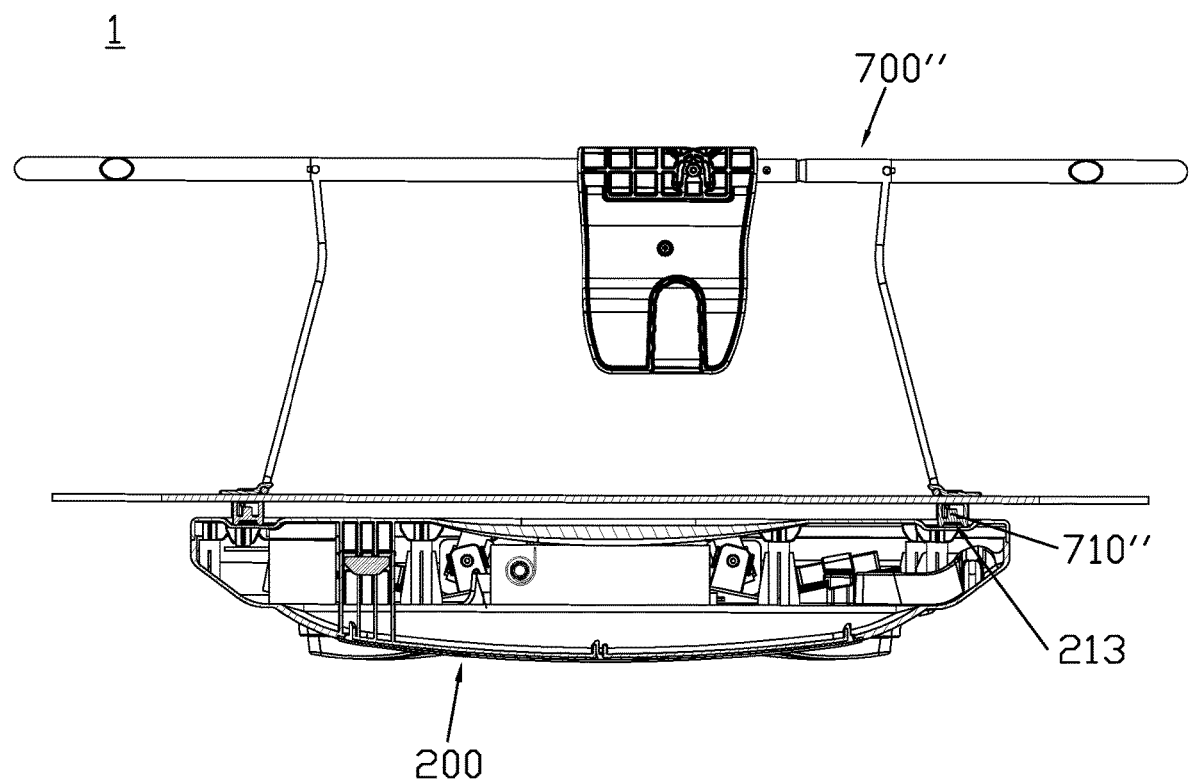
FIG. 22 is a schematic sectional view of FIG. 21.
Figure 22A:
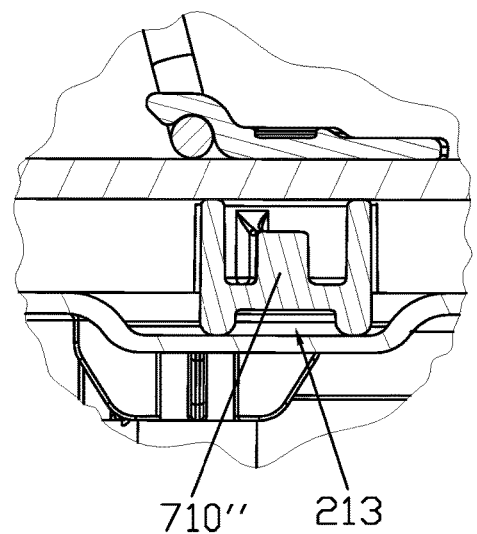
FIG. 22A is an enlarged view of a part of FIG. 22, illustrating that a protruding member is removably retained in a third engaging groove.

FIGS. 21, 22, and 22A illustrate that the automatic swing device is used with a bassinet 700". The bassinet 700" has four bottom corners each provided with a protruding member 710". The bassinet 700" is securely mounted on the base seat 200 by inserting the protruding members 710" in the third engaging grooves 213, respectively. In this way, the protruding members 710" are removably retained in the third engaging grooves 213, so that the bassinet 700" can swing together with the base seat 200 through the operation of the drive mechanism 100.

In summary, the drive mechanism 100 of the automatic swing device of the disclosure includes two electromagnetic driving units 110, 120 that are symmetrically disposed at the bottom of the automatic swing device (i.e., the bottom part 220 of the base seat 200), and the control unit 100' that is electrically connected to the electromagnetic driving units 110, 120 for controlling the electromagnetic driving units 110, 120 to be alternately activated and de-activated, so as to generate the intermittent magnetic force to drive the swinging movement of the automatic swing device. The swing speed and angle of the automatic swing device can be controlled by how frequent the switching of the current flow through the first and second electromagnets 112, 122 occurs, thereby providing easy operation and convenience in use. The automatic swing device can be used with different baby carrying devices to increase the application range.

Since the remaining components of the automatic swing device are well known to those skilled in the art, further detail of the same are not described herein for the sake of brevity.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A drive mechanism adapted for use with a swing device, said drive mechanism comprising:
    two symmetrically-disposed electromagnetic driving units adapted to be pivotally connected to a bottom of the swing device; and
    a control unit electrically connected to said electromagnetic driving units for controlling said electromagnetic driving units to be alternately activated and deactivated, so as to generate an intermittent magnetic force to drive swinging movement of the swing device,
    wherein each of said electromagnetic driving units includes a sensor set that is adapted for detecting speed of the swing movement of the swing device and angle of the swing device.

2. The drive mechanism as claimed in claim 1, wherein:
    each of said electromagnetic driving units further includes
        a support arm that has a pivot end adapted to be pivotally connected to the bottom of the swing device, and an opposite end opposite to said pivot end,
        an electromagnet that is securely coupled to said opposite end of said support arm, and
        a permanent magnet that is adapted to be securely coupled to the bottom of the swing device and that corresponds in position to said electromagnet;
    for each of said electromagnetic driving units, said sensor set is adapted to be disposed between said support arm and the bottom of the swing device; and said control unit controls said electromagnets of said electromagnetic driving units to be alternately activated and deactivated so that the intermittent magnetic force is generated between said electromagnets and said permanent magnets to drive the swinging movement of the swing device.

3. The drive mechanism as claimed in claim 2, wherein when said control unit controls said electromagnet of one of said electromagnetic driving units to be activated, a magnetic repulsive force is generated between said electromagnet and said permanent magnet of said one of said electromagnetic driving units.

4. The drive mechanism as claimed in claim 2, wherein said pivot end of said support arm of each of said electromagnetic driving units is adapted to be pivotally connected to the bottom of the swing device at a position proximate to a center of the swing device.

5. The drive mechanism as claimed in claim 2, wherein each of said electromagnetic driving units further includes a retaining member that securely retains said electromagnet at said opposite end of said support arm.

6. The drive mechanism as claimed in claim 2, wherein each of said electromagnetic driving units further includes a mounting seat that is adapted to be fixedly connected to the bottom of the swing device for mounting of said permanent magnet thereon and that has an opening for exposing said permanent magnet.

7. The drive mechanism as claimed in claim 6, wherein each of said electromagnetic driving units further includes a holding member that is formed with an accommodating groove for accommodating said permanent magnet therein, and that cooperates with said mounting seat to retain said permanent magnet therebetween.

8. The drive mechanism as claimed in claim 2, wherein said support arm of each of said electromagnetic driving units is provided with a connecting strip that is adapted to extend into the swing device, said sensor set being mounted on said connecting strip.

9. The drive mechanism as claimed in claim 2, wherein said sensor set of each of said electromagnetic driving units includes
a displacement sensor mounted on said support arm, adapted to extend into the swing device, and including a plurality of displacement sensing spots, and
a detecting sensor electrically connected to said control unit, and adapted to be fixedly disposed in the bottom of the swing device at a position corresponding to said displacement sensing spots for monitoring said displacement sensing spots and sending monitoring information to said control unit.

10. The drive mechanism as claimed in claim 9, wherein said detecting sensor monitors said displacement sensing spots by using diffraction grating principle.

11. The drive mechanism as claimed in claim 9, wherein each of said electromagnetic driving units further includes a sensor-connecting member that is adapted to be fixedly disposed on the bottom of the swing device, said detecting sensor being coupled to said sensor-connecting member and protruding from said sensor-connecting member.

12. A swing device comprising:
a base seat having a top surface provided with an engaging mechanism which is adapted for retaining a baby carrying device thereon; and
said drive mechanism as claimed in claim 1; wherein said control unit is disposed in said base seat, said electromagnetic driving units are symmetrically disposed at a bottom surface of said base seat, and said drive mechanism drives swinging movement of the base seat.

13. The swing device as claimed in claim 12, wherein said engaging mechanism has two spaced-apart first engaging grooves formed in said top surface of said base seat, and a second engaging groove located between said first engaging grooves, at least one of said first and second engaging grooves being adapted for engaging the baby carrying device.

14. The swing device as claimed in claim 13, wherein said second engaging groove has a laterally-extending space portion that is adapted to removably retain a lock piece of the baby carrying device therein.

15. The swing device as claimed in claim 13, wherein said engaging mechanism further has a third engaging groove formed in said top surface of said base seat and adapted to removably retain a protruding member of the baby carrying device therein.

16. The swing device as claimed in claim 12, the base seat being disposed on a contact surface, said swing device further comprising a movement-arresting member pivotally connected to said bottom surface of said base seat, and being pivotable between an extended position, where said movement-arresting member is in contact with the contact surface so as to arrest the swinging movement of said base seat, and a collapsed position, where said movement-arresting member is not in contact with the contact surface so as to permit the swinging movement of said base seat.

17. The swing device as claimed in claim 12, further comprising a plurality of indicating lights disposed on said top surface of said base seat and electrically connected to said control unit for indicating swing speed of the swing device.

18. The swing device as claimed in claim 12, further comprising a first container adapted for storing a remote controller which is operable to control the swing speed of the swing device, and a second container adapted for storing a portable charger.

* * * * *